US006624917B1

United States Patent
Paschal et al.

(10) Patent No.: US 6,624,917 B1
(45) Date of Patent: Sep. 23, 2003

(54) OPTICAL POWER ADJUSTMENT CIRCUITS FOR PARALLEL OPTICAL TRANSMITTERS

(75) Inventors: Matthew James Paschal, Rochester, MN (US); Kevin Paul Demsky, Rochester, MN (US); Ladd William Freitag, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,282

(22) Filed: Oct. 28, 1999

(51) Int. Cl.[7] .......................... H04B 10/04; H01S 3/00; H01S 3/13
(52) U.S. Cl. ................ 359/187; 359/180; 372/38.07; 372/38.02; 372/29.02; 372/29.014; 372/29.015
(58) Field of Search .................... 359/187, 180; 372/38.07, 38.02, 38.04, 29.015, 29.011, 29.012, 29.014, 29.02

(56) References Cited

U.S. PATENT DOCUMENTS

| | | | |
|---|---|---|---|
| 3,633,120 A | 1/1972 | Battjes | 330/30 R |
| 4,709,370 A | 11/1987 | Bednarz et al. | 372/38 |
| 5,019,769 A | 5/1991 | Levinson | 372/31 |
| 5,521,736 A * | 5/1996 | Swirhun et al. | 359/158 |
| 5,625,480 A | 4/1997 | Swirhun et al. | 359/158 |
| 5,675,599 A * | 10/1997 | Abe et al. | 372/38 |
| 5,844,928 A * | 12/1998 | Shastri et al. | 372/38 |
| 5,883,910 A * | 3/1999 | Link | 372/38 |
| 5,914,976 A * | 6/1999 | Jayaraman et al. | 372/50 |
| 5,974,064 A * | 10/1999 | Uchida | 372/38 |
| 6,055,252 A * | 4/2000 | Zhang | 372/34 |
| 6,272,160 B1 * | 8/2001 | Stronczer | 372/38.02 |

OTHER PUBLICATIONS

"Lasers: harnessing the atom's light"; James P. Harbison et al., 1997, pp. 160–177.
Copending Application SN: 09/429,280 (Atty Reference RO999–081) Filed Oct. 28, 1999.
Copending Application SN: 09/218,340 (Atty Reference RO998–231), Field Dec. 22, 1998.
Copending Application SN: 09/388,313 (Atty Reference RO999–037), Filed Sep. 01, 1999.

* cited by examiner

Primary Examiner—Leslie Pascal
Assistant Examiner—M. R. Sedighian
(74) Attorney, Agent, or Firm—Christopher H. Lynt; Matthew J. Bussan; Leslie J. Payne

(57) ABSTRACT

Optical power adjustment is provided for parallel optical transmitters, in particular, for an array of vertical cavity surface emitting lasers (VCSEL's). The lasers in the array can be independently digitally adjusted with associated digital circuitry to compensate for manufacturing and temperature variations. In particular, the threshold current and modulation current for each VCSEL in the array, as well as a global temperature coefficient for all the VCSEL's in the array, can be digitally setup and adjusted for desired power levels. Once set, the associated digital code can be stored in non-volatile memory, and loaded at powering-up of the transmitters.

22 Claims, 6 Drawing Sheets

OPTICAL POWER ADJUSTMENT CIRCUITS FOR PARALLEL OPTICAL TRANSMITTERS

BACKGROUND OF THE INVENTION

1. Field of the Invention

The invention relates to the field of optical transmitters, and in particular, to optical power control circuitry for parallel optical transmitters having vertical cavity surface emitting laser (VCSEL) arrays.

2. Background Information

High speed direct coupled (DC) parallel optical data transmitters commonly use semiconductor vertical cavity surface emitting laser diode arrays (VCSEL's) as their light sources. The laser device called a VCSEL (Vertical Cavity Surface Emitting Laser) is a semiconductor laser made of many layers, e.g., 600, which emits light vertically from a lower surface and in a direction parallel to the direction of its optical cavity, as opposed to an edge-emitting type laser structure. VCSEL's have advantages over edge-emitting type structures because, for example, the edge-emitting type lasers must be precisely broken or cleaved individually to form each device during manufacturing. However, with VCSEL's, literally millions of laser devices can be made simultaneously in an etching process.

VCSEL's are currently some of the smallest lasers being produced. There is a relatively new type of VCSEL in development, the QD-VCSEL. The 'QD' signifies the Quantum Dots which are used in the active layer of this type of VCSEL. The QD-VCSEL promises to achieve even further size reductions.

VCSEL's have a range of uses. For example, a specially designed VCSEL has been used to create an optical latch or optical state memory, the VCSEL transitioning and latching in the ON state when an optical input is received. Arrays of such VCSEL's open up possibilities for various massively parallel optical computing applications such as pattern recognition. VCSEL's have data communications applications as well as would be clear to one skilled in the art. For more information about VCSEL's, see, for example, "LASERS, Harnessing the Atom's Light," Harbison et al., Scientific American Library, 1998, pages 169–177.

A graph representing the optical power output $P_O$ in milliwatts (mW) vs. the current input I in milliamps (mA) for a typical VCSEL is shown in FIG. 1. As is shown in the graph, the VCSEL does not begin lasing until the current through it exceeds a certain laser threshold value, shown as $I_{th}$ in the figure. The slope of the curve above $I_{th}$ is commonly referred to in the art as the differential quantum efficiency (DQE) of the VCSEL.

However, these two VCSEL diode parameters, $I_{th}$ and DQE, along with the wavelength of the output light, are dependent on operating temperature, as well as on process variations. The manufacturing process variations are, at present, not completely controllable or predictable. Therefore, a method to adjust the current through the VCSEL to compensate for these variations is required. Some methods are known, for example, from U.S. Pat. No. 4,709,370, Bednarz et al., Nov. 24, 1987 and U.S. Pat. No. 3,633,120, Battjes Jan. 4, 1972.

To prevent over-powering the laser and to meet end of life requirements, a method must exist to compensate for the effects of process and operating temperature variations on output power.

Serial optical data transmitters ordinarily use laser diodes, e.g., VCSEL's or edge-emitters, that are packaged with a photo detector that feeds back a current proportional to the optical output power of the laser diode. FIG. 2 shows a simple circuit integrating this type of laser/photo detector package into an operational amplifier (OP AMP) negative feedback loop to control the optical output power of the laser diode. During calibration, the feedback current through the photo detector is used to adjust the average optical power out of the laser by adjusting the potentiometer labeled 'R POT' changing the voltage on the non-inverting input of the OP AMP which controls the laser drive transistor to provide more or less current through the laser. In operation, this feedback current serves to dynamically adjusts the laser current in response to average optical power changes caused by changes in operating temperature.

However, to use this simple method for VCSEL diode arrays would require a photo detector for each VCSEL diode in the array. VCSEL arrays used in communications, for example, commonly contain 12 or more VCSEL's, therefore 12 or more photo detectors would be required. Some problems with such an arrangement are that optical cross-talk from one VCSEL to adjacent VCSEL's, and that physical size limitations may preclude using a photo detector for each VCSEL in an array. In recently contemplated applications of VCSEL's, such as massively parallel processing, mentioned above, where perhaps millions of VCSEL's would be used at once in an array, these problems could become overwhelming.

A known solution to these problems is to dynamically adjust all the VCSEL's optical power levels using a reference VCSEL and reference photo detector in a VCSEL array, as shown in FIG. 3. Examples of such an arrangement are described in U.S. Pat. No. 5,625,480, Swirhun et al., issued Apr. 29, 1997 and U.S. Pat. No. 5,521,736, Swirhun et al., issued May 28, 1996. These prior patents describe (Abstract) electronic circuits and methods to dynamically compensate for the effects of the substrate temperature and aging behavior of the light emitters at both the transmitter and the receiver in a parallel optical interconnect system transmitting a plurality of DC non-return to zero (NRZ) data and an independent clock signal. An arrangement of light emitters is used to reduce or avoid skew problems as well.

The reference VCSEL and reference photo detector methods, however, are based on the assumption that all VCSEL's in the array have identical $I_{th}$ and DQE. Of course, if these parameters are not identical, which is likely, some VCSEL's could be operating close to $I_{th}$. This could cause turn on delay and increased skew between channels, which, of course, is not a desirable phenomenon, especially as data rates increase. On the other hand, some VCSEL's could be operating at higher average power than the reference VCSEL, possibly causing an over-power condition. Therefore, the reference VCSEL/photodetector methods are not a perfect solution to the problems discussed at the outset.

Another semiconductor laser diode control method is described in U.S. Pat. No. 5,019,769, Levinson, issued May 28, 1991. This patent describes (Abstract) a laser diode controller using a programmed micro-controller to accurately control the process of turning on and selecting the operating point of a laser diode. The laser diode has a front facet for transmitting light, and a back facet for monitoring the laser diode's optical output power. Once the back facet of the laser diode is calibrated, the controller can accurately monitor the laser diode's operating characteristics, and can select the best operating point current based on the current operating characteristics of the laser diode. During calibration of the laser diode, the controller can check the linearity of the laser diode's optical output power as a function of drive current, and can thereby detect defects in the laser diode. In a full duplex optical link, the controllers at the link's ends prevent the laser diodes from generating light at their full normal intensity until the integrity of the link has been established, thereby preventing light from the laser diode's from accidentally damaging user's eyes. Furthermore, the controllers can use the full duplex link to establish lower operating point drive currents that would otherwise be used to lengthen the lifetime of the laser diodes. A laser diode's operating characteristics change over time in such a way as to enable the controller to predict when the laser will fail. The controller records the operating characteristics of the laser diode in a nonvolatile memory, analyzes changes in those characteristics, and generates a failure warning message when those changes match predefined failure prediction criteria.

However, this micro-controller arrangement is apparently just a more complex version of the prior method shown in FIG. 2 and described above, with the same disadvantages associated with having a photo detector for each laser in an array for a parallel communication system.

Therefore, a need exists for a better way of controlling laser optical power in a parallel array of optical transmitters, in particular, VCSEL's.

Copending application Ser. No. 09/218,340, filed Dec. 22, 1998, assigned to the assignee of the present application, describes a constant current source circuit with variable temperature compensation to provide constant current to stabilize the performance of a load, e.g., a parallel array of VCSEL's. The constant current source compensates for changes in the load due to temperature so that constant direct current bias power will be delivered to the load. Compensation for changes in performance resulting from changes of temperature is provided. The circuit mixes variable amounts of current having a negative temperature coefficient with current having a positive temperature coefficient. Analog and digital versions of the circuit are disclosed. In the analog version, the amount of current having a positive temperature coefficient is added to an amount of current having a negative temperature coefficient as determined by the voltage difference between a variable control voltage input to transistors and a bandgap reference voltage. A transistor in each of two current selectors is connected to the variable control voltage, one of which is connected to ground and the other of which is output; and another transistor in each current selector is connected to the reference voltage, and again one transistor is grounded and the other is output whose current is mixed with the output from the transistor in the first current selector connected to the variable control voltage. A continuous range of temperature coefficients are realizable by varying the control voltage with respect to the bandgap reference voltage. The digital version has a digital-to-analog converter connected to a bias voltage from the current having a positive temperature coefficient and a second digital-to-analog converter connected to a second bias voltage from the current having a negative temperature coefficient. A digital input signal to a corresponding switch determines if its respective transistor in each of the digital-to-analog converters conduct current. The two digital-to-analog converters may be configured in a common centroid arrangement of integrated complementary unit cells. The constant current source circuit can be used to drive off-chip parallel loads such as VCSEL's.

Copending related application Ser. No. 09/388,313, filed Sep. 1, 1999, entitled DUAL CURRENT SOURCE WITH TEMPERATURE COEFFICIENTS OF EQUAL AND OPPOSITE MAGNITUDE," assigned to the same assignee as the present application, discloses (Abstract) a dual current source circuit which provides dual currents of the same magnitude and having coefficients of temperature compensation that are also equal but opposite.

Copending related application Ser. No. 09/429,280 filed Oct. 28, 1999, entitled "VERTICAL CAVITY SURFACE EMITTING LASER (VCSEL) DRIVER WITH LOW DUTY CYCLE DISTORTION AND DIGITAL MODULATION ADJUSTMENT" assigned to the same assignee as the present application, describes a method and apparatus which achieves low duty cycle distortion and digital modulation adjustment in one embodiment disclosed therein, by providing circuitry which provides for independent adjustment of currents to adjust for current source mismatches.

However, a need exists for an optical power adjustment arrangement which overcomes the limitations of the prior solutions. A need exists for optical power adjustment circuitry for parallel optical transmitters which can independently digitally adjust the threshold current and modulation current for each VCSEL in an array, as well as provide a global temperature coefficient for all the VCSEL's in the array which can be digitally set. In particular, an open loop method would be desirable to avoid the disadvantages associated with closed loop methods described above.

SUMMARY OF THE INVENTION

It is, therefore, a principle object of this invention to provide a method and apparatus for optical power adjustment circuits for parallel optical transmitters.

It is another object of the invention to provide an open loop method to adjust the optical power level to compensate for temperature and process variations, particularly, in VCSEL arrays.

It is another object of the invention to provide a method and apparatus that solves the above mentioned problems by providing optical power adjustment circuitry for parallel optical transmitters which can independently digitally adjust the threshold current and modulation current for each VCSEL in an array, as well as providing a global temperature coefficient for all the VCSEL's in, the array which can be digitally set.

These and other objects of the present invention are accomplished by the method and apparatus disclosed herein.

As mentioned above, others have solved the above-mentioned problems by including a reference VCSEL and photo detector on the VCSEL array. The characteristics of the reference VCSEL are used to set the low and high optical power levels of the remaining VCSEL's in the array. According to an aspect of the present invention, however, neither an extra VCSEL as a reference, nor a photo detector, are required.

Further, according to another aspect of the invention, differences in $I_{th}$ and DQE across a VCSEL array are compensated for, for each VCSEL, as compared with the prior solution of reliance on a single reference VCSEL and detector.

According to an aspect of the invention, a circuit to independently digitally adjust the threshold current and modulation current for each VCSEL in an array is provided.

According to another aspect of the invention, a global temperature coefficient (tempco) can be digitally set that applies to all the VCSEL's in the array.

According to an aspect of the invention, a parallel optical transmitter that incorporates the invention contains a shift register that holds the digital code for a threshold adjustment digital to analog converter (DAC) and a modulation adjustment DAC.

According to an aspect of the invention, another shift register holds the digital code for a temperature coefficient (tempco) DAC current reference.

According to an aspect of the invention, a non-volatile storage device, e.g., an electronically eraseable and programmable read only memory (EEPROM), is provided which retains the desired digital codes when power is removed from the parallel transmitter.

According to another aspect of the invention, two currents with specified temperature coefficients are generated by the tempco DAC reference and input into the threshold adjustment DAC and the modulation current adjustment DAC.

According to an aspect of the invention, the threshold adjustment current DAC and the modulation current adjustment DAC both multiply their input currents by factors set by their respective digital input codes.

According to an aspect of the invention, the current out of the threshold current adjustment DAC is input to a laser current switch, along with the current out of the modulation current adjustment DAC.

According to an aspect of the invention, differential input data signals to the laser current switch (DATA +/−) cause the VCSEL optical power to switch between a low level, set by the threshold current adjustment DAC, and a high level, set by the addition of the threshold current adjustment DAC and the modulation current adjustment DAC.

According to an aspect of the invention, the tempco current DAC varies the low current out of the laser current switch with a tempco that is equal in magnitude to the VCSEL $I_{th}$ vs. T characteristic.

According to an aspect of the invention, the tempco current DAC also varies the modulation current out of the laser current switch with a tempco that is equal in magnitude but opposite in sign to the DQE vs. T characteristic.

According to an aspect of the invention, as a result, the VCSEL outputs maintain constant low and high optical power levels across the desired temperature range.

According to an aspect of the invention, to determine the proper DAC settings, a serial digital bit stream is shifted into a shift register. The low and high optical power levels are then measured with an optical power meter. This procedure is repeated until the desired low and high optical power levels are reached for each VCSEL in the array.

According to an aspect of the invention, the temperature coefficient DAC's can be set in two ways. The first way is to measure the tempcos of a sample of VCSEL arrays, and use the mean tempcos ($I_{th}$ and DQE) for all VCSEL arrays thereafter. The second way is to use a thermocouple to determine the average tempcos for a given VCSEL array, and set the tempco DAC's to have these tempcos. Therefore, each VCSEL array would have its own tempcos set independent of any other VCSEL array.

According to an aspect of the invention, once the proper digital codes are determined for the threshold current tempco, the modulation current tempco, the threshold current DAC, and the modulation current DAC, the digital code in the shift register can be written into the non-volatile memory, e.g., EEPROM.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

As mentioned in the Summary section, one aspect of the invention is that it provides circuitry to independently digitally adjust the threshold current and modulation current for each VCSEL in an array. Also, a global temperature coefficient (tempco) can be digitally set that applies to all the VCSEL's in the array.

Figure 1:
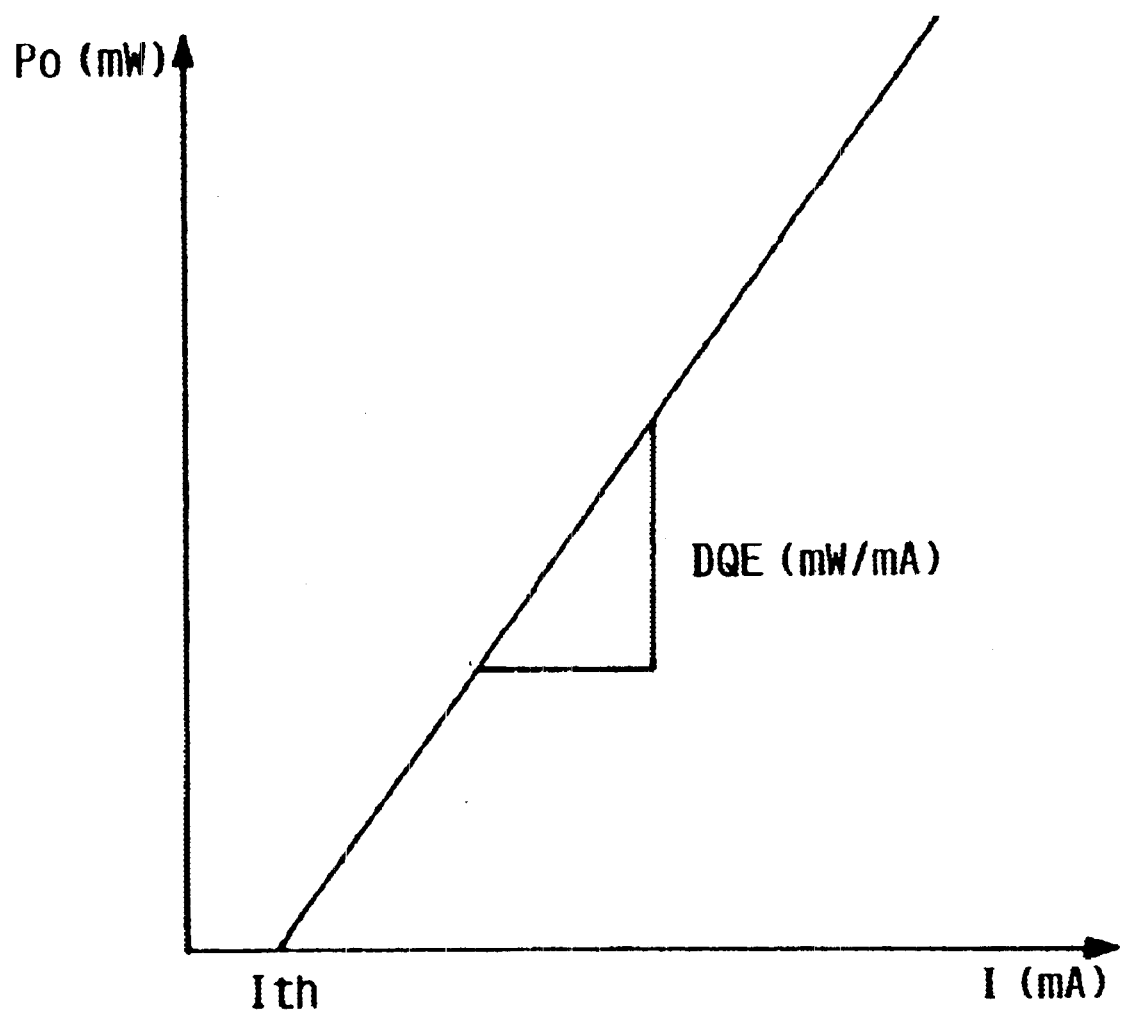
FIG. 1 illustrates a graph of optical power versus laser current for a typical VCSEL.
Figure 2:
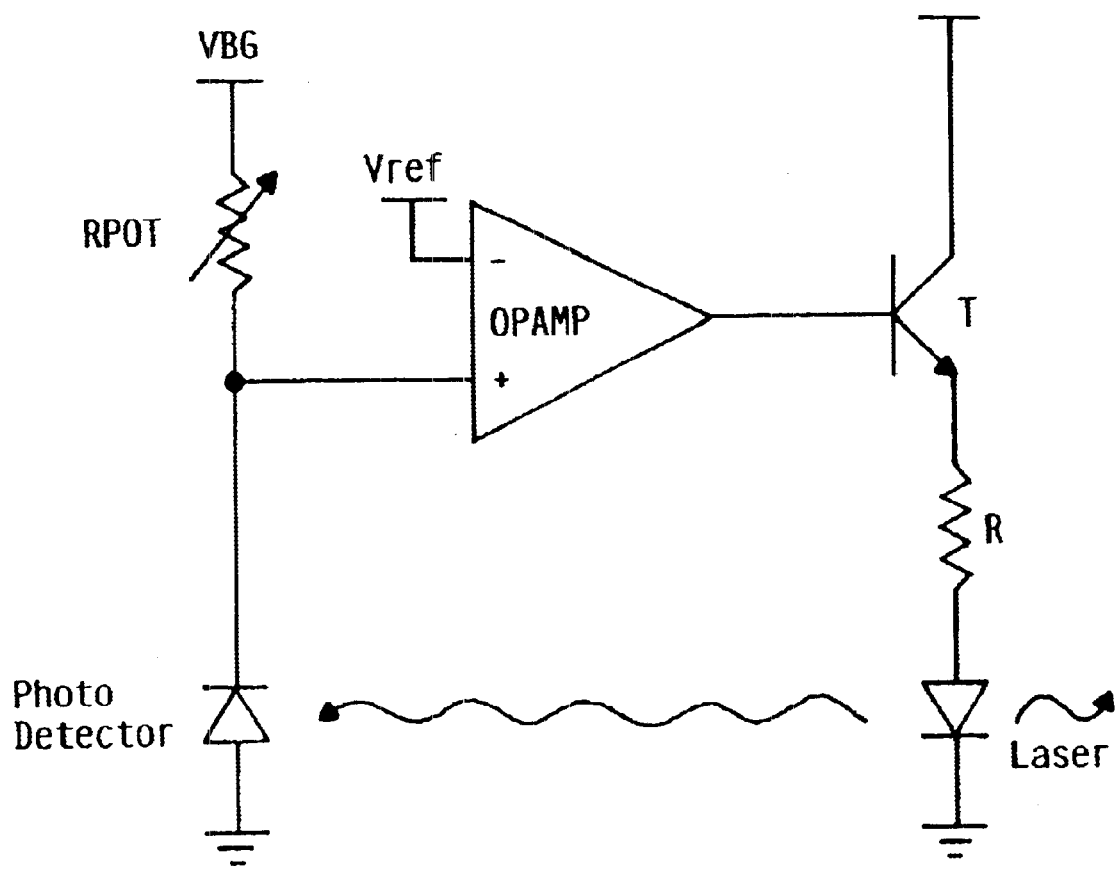
FIG. 2 illustrates a conventional circuit integrating a laser/photo detector package into an OP AMP negative feed back loop to control the optical output power.
Figure 3:
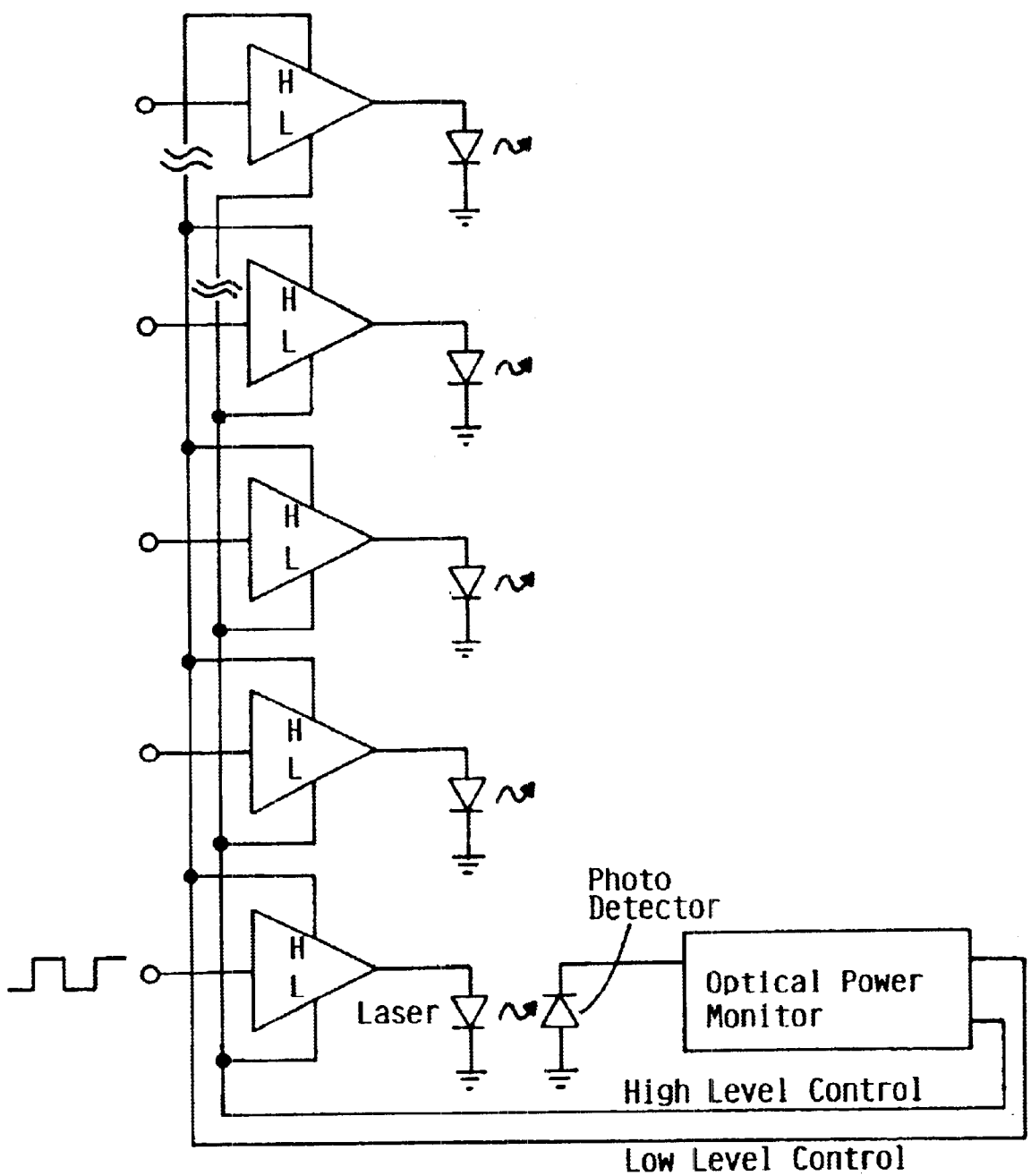
FIG. 3 illustrates a conventional reference laser photo detector arrangement for dynamically controlling optical power in a laser array.
Figure 4:
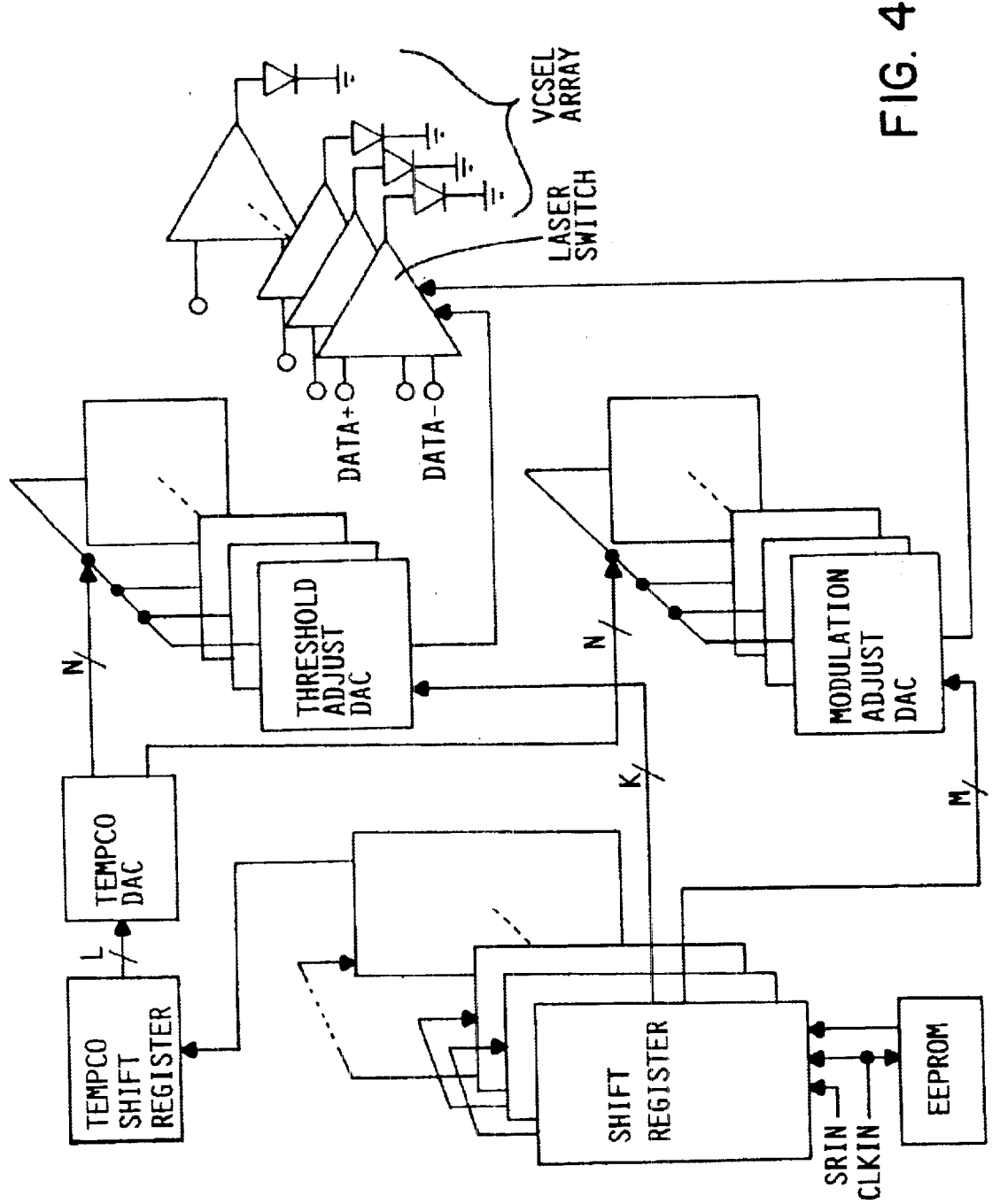
FIG. 4 illustrates a parallel optical transmitter having an optical power adjustment arrangement according to an exemplary embodiment of the invention.

With reference to FIG. 4, the details of one channel of a parallel optical transmitter having an optical power adjustment arrangement according to an exemplary embodiment of the invention is illustrated schematically in block diagram form.

The exemplary circuitry of FIG. 4 includes a shift register that holds the digital code for the threshold adjust DAC's and the modulation adjust DAC's. Another shift register, labeled tempco shift register, holds the digital code for the tempco DAC current reference. The tempco DAC provides two reference currents, as will be described in more detail below.

A non-volatile storage device, e.g., an EEPROM, retains the desired digital codes when power is removed from the parallel transmitter. The shift registers supply the codes to the DAC's from the EEPROM when power is applied. The desired codes are written into the EEPROM during a set-up calibration of the lasers, described below.

Two reference currents with specified tempcos are generated by the tempco DAC and input into the threshold adjust DAC's and the modulation adjust DAC's. The threshold adjust DAC's and the modulation adjust DAC's both multiply their input currents by factors set by their respective digital input codes. The respective current out of a given one of the threshold adjust DAC's is input to the associated laser current switch, as is the current out of the respective associated modulation current adjustment DAC.

The differential input data signals to the laser current switch, DATA +/−, cause the VCSEL optical power to switch between a low level set by the threshold current adjust DAC, and a high level set by the sum of the threshold adjust DAC and the modulation adjust DAC outputs.

An output current of the tempco DAC varies the low current out of the laser current switch with a temperature coefficient characteristic that is equal in magnitude to the VCSEL threshold current $I_{th}$ vs. T (temperature) characteristic. The tempco DAC also provides an output current which varies the modulation current out of the laser current switch with a temperature coefficient characteristic that is equal in magnitude but opposite in sign to the differential quantum efficiency DQE vs. T characteristic.

Consequently, the VCSEL outputs maintain constant low and high optical power levels across the temperature range in question.

To determine the proper DAC settings during calibration, a serial digital bit stream is shifted into the shift register via the data input SRIN and associated clock CLKIN. The low and high optical power levels are then measured with a optical power meter. This procedure is repeated until the desired low and high optical power levels are reached for each VCSEL in the array.

The temperature coefficient DAC's can be set in two ways. The first is to measure the temperature coefficients of a sample of VCSEL arrays and use the mean temperature coefficients for all VCSEL arrays thereafter. The second method is to use a thermocouple to determine the average temperature coefficients for a given VCSEL array and set the tempco DAC's to have these temperature coefficients. Therefore, each VCSEL array would have its own temperature coefficients set independent of any other VCSEL array.

Once the proper digital codes are determined for the threshold current temperature coefficients, the modulation current temperature coefficients, the threshold DAC's and the modulation DAC's, the digital code in the shift register can be written into the non-volatile storage, i.e., the EEPROM.

Although, in the illustrated exemplary embodiment, the digital codes are written into EEPROM the non-volatile memory used could include any recording medium, such as a floppy disk, a high-capacity read only memory in the form of an optically read compact disc or CD-ROM, a tape, a transmission type media, such as a digital or analog communications link, or a similar computer program product.

Figure 5A:
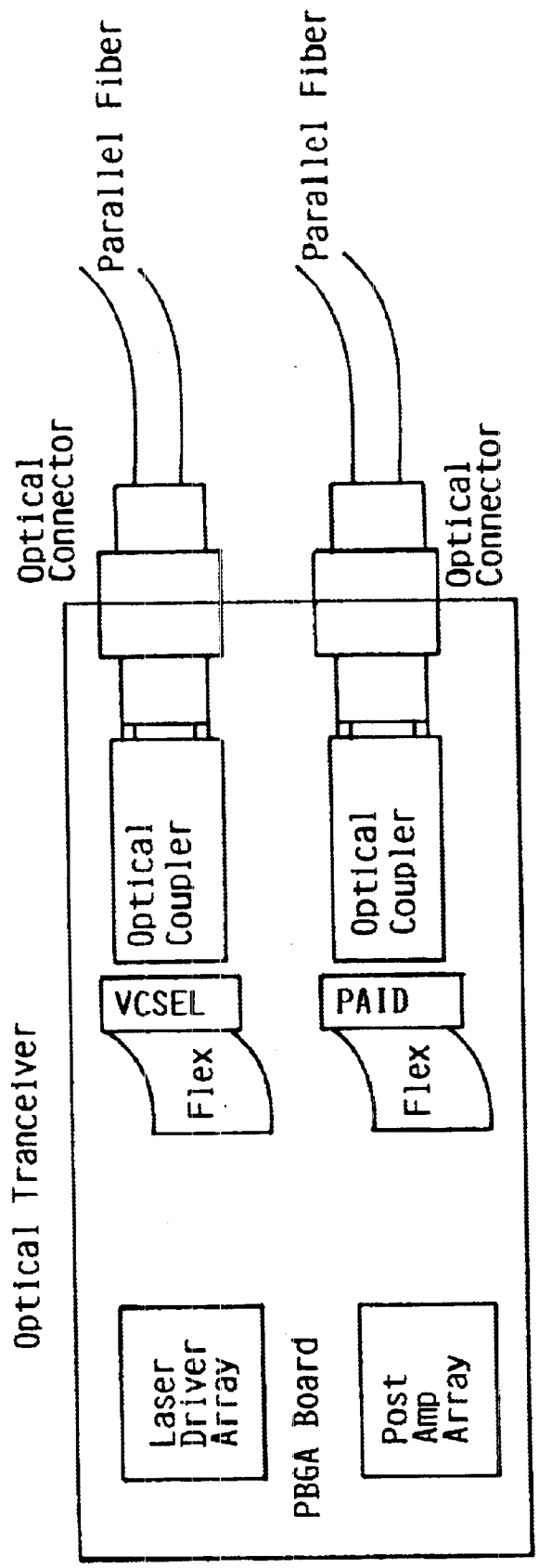
FIGS. 5a and 5b illustrate an application of the invention in an optical transceiver and a system using the transceiver, respectively.
Figure 5B:
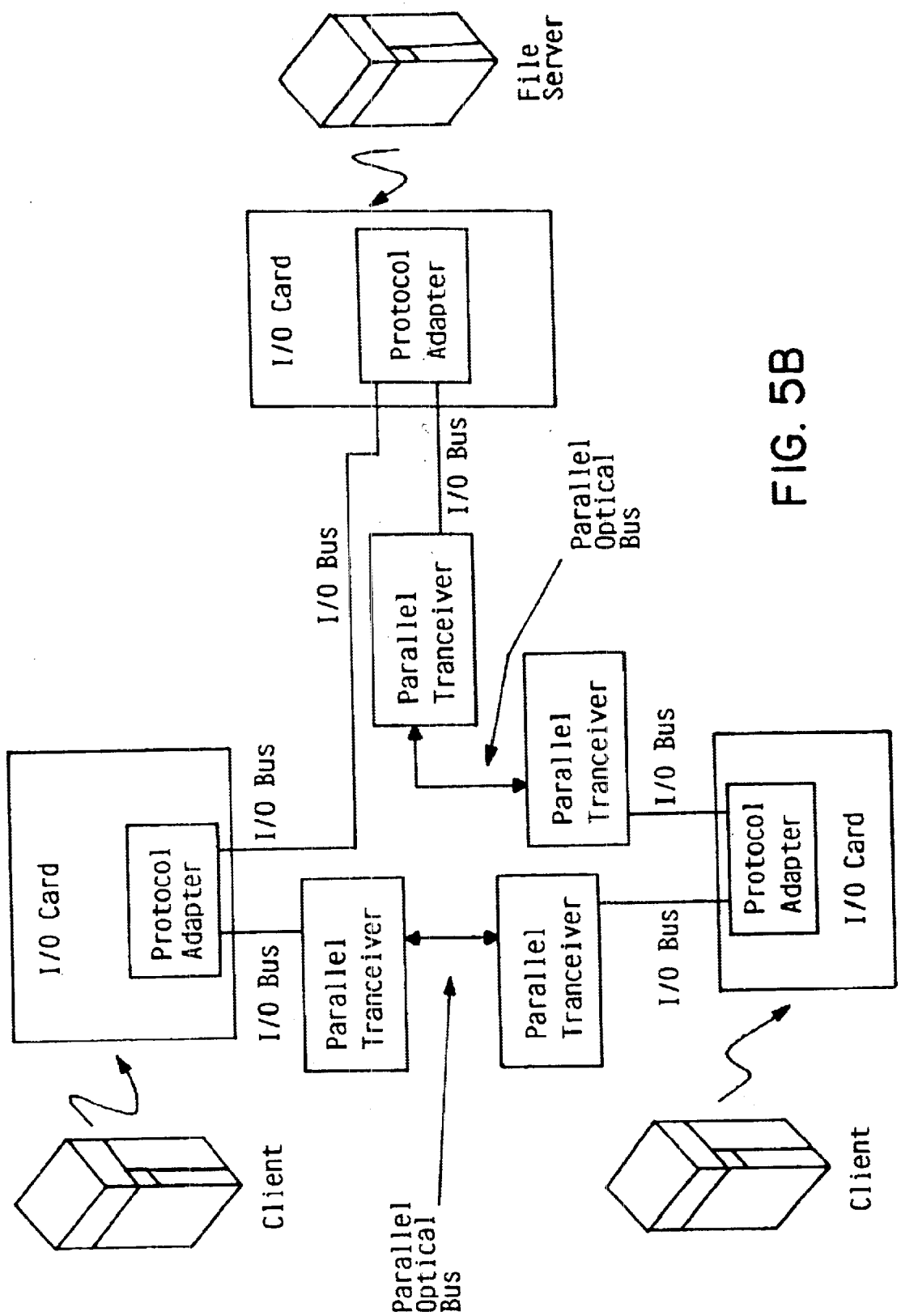

FIGS. 5a and 5b illustrate an application of the invention in an optical transceiver and a system using the transceiver, respectively. The optical transceiver is shown schematically as functional blocks on a PBGA board. One of the blocks is labeled Laser Driver Array, and it is in this block that the exemplary embodiment of the invention would be implemented. The Laser Driver Array is coupled to the VCSEL's by a flexible cable. The optical output of the VCSEL's is coupled into a parallel fiber by an optical connector and optical coupler. The transceiver has a pre-amp integrated detector (PAID) which receives optical input from a parallel fiber through another optical connector and optical coupler. The PAID is coupled to a Post Amp Array by another flexible cable.

A system using four transceivers, such as the transceiver just described, is shown in FIG. 5b. In the illustrated system, there are two client boxes and a file server, each having an input/output (I/O) card with a protocol adapter coupling the device to a respective I/O bus. One client is connected to the file server on an I/O bus directly, i.e., electrically. The other client is connected to the file server via a parallel optical bus having transceivers at each end which are coupled to the respective I/O buses. The two clients are connected optically in the same manner.

Of course, the disclosed and described invention is not limited in application to the just described transceiver and system using the transceiver.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. An optical power adjustment apparatus for control optical power in a parallel optical transmitter having a plurality of optical output comprising:

threshold current adjusting means for individually adjusting a threshold current of each of the plurality of optical output devices without use of a closed loop feedback;

modulation current adjusting means for individually adjusting a modulation current of each of the plurality of optical output devices without use of a closed loop feedback; and global temperature coefficient adjusting means for globally compensating for current variations due to a global temperature coefficient of the plurality of optical output devices, by appropriately adjusting the threshold current adjusting me=and the modulation current adjusting means further comprising:

a first storage means for storing control signals to be transferred to the threshold current adjusting means and the modulation current adjusting means, to set the threshold current adjusting means and the modulation current adjusting means.

2. A method of optical power adjustment for parallel optical transmitters, comprising utilizing the apparatus according to claim 1.

3. An optical power adjustment apparatus for controlling optical power in a parallel optical transmitter having a plurality of optical output devices comprising:

threshold current adjusting means for individually adjusting a threshold current of each of the plurality of optical output devices;

modulation current adjusting means for individually adjusting a modulation current of each of the plurality of optical output devices;

global temperature coefficient adjusting means for compensating for current variations due to a global temperature coefficient of the plurality of optical output devices, by appropriately adjusting the threshold current adjusting means and the modulation current adjusting means; and a first storage means for storing control signals to be transferred to the threshold current adjusting means and the modulation current adjusting means, to set the threshold current adjusting means and the modulation current adjusting means, wherein the first storing means further is for holding a control signals to set the global temperature coefficient adjusting means, and wherein the apparatus further comprises:

a second storing means for receiving from the first storing means the respective control signals to be transferred to the global temperature coefficient adjusting means, and for transferring the respective control signals to the global temperature coefficient adjusting means, to set the global temperature coefficient adjusting means.

4. The optical power adjustment apparatus according to claim 3, wherein the optical output devices each comprise a laser and a laser switch, and wherein:

the first storing means and the second storing means each comprise a respective shift register, and the respective control signals stored thereby comprise respective digital code;

the threshold current adjusting means and the modulation current adjusting means each comprise a digital to analog converter for receiving the respective digital code and outputting a respective analog signal to a respective analog laser switch; and the global temperature coefficient adjusting means comprises a digital to analog converter for receiving a respective digital code, and for outputting respective analog signals to the threshold current adjusting means and the modulation current adjusting means.

5. The optical power adjustment apparatus according to claim 4, further comprising programmable non-volatile storage means for storing the respective digital codes for the threshold current adjusting means, the modulation current adjusting means, and the global temperature coefficient adjusting means, and providing the respective digital codes to the first storing means.

6. The optical power adjustment apparatus according to claim 5, wherein the programmable non-volatile storage means comprises electronically erasable and programmable read only memory.

7. The optical power adjustment apparatus according to claim 6, wherein the respective analog signals output to the threshold current adjusting means and the modulation current adjusting means by the global temperature coefficient adjusting means, comprise respective input currents; and wherein the respective input currents to the threshold current adjusting means and the modulation current adjusting means are multiplied therein.

8. A method of determining operating settings for a plurality of optical output devices comprising utilizing the optical power adjustment apparatus according to claim 7.

9. A method of optical power adjustment for parallel optical transmitters, comprising utilizing the apparatus according to claim 3.

10. A method of optical power adjustment for parallel optical transmitters, comprising utilizing the apparatus according to claim 4.

11. A method of optical power adjustment for parallel optical transmitters, comprising utilizing the apparatus according to claim 5.

12. In an optical power adjustment apparatus for controlling the optical power of a parallel optical transmitter having a plurality of optical output devices, the adjustment apparatus having threshold current adjusting means for individually adjusting threshold current of each of the plurality of optical output devices, modulation current adjusting means for individually adjusting modulation current of each of the plurality of optical output devices, global temperature coefficient adjusting means for compensating for optical power variations due to a global temperature coefficient of the plurality of optical output devices, by appropriately adjusting the threshold current adjusting means and the modulation current adjusting means, and a first storing means for storing control signals to be transferred to the threshold current adjusting means and the modulation current adjusting means, to set the threshold current adjusting means and the modulation current adjusting means, a method of determining operating settings for a plurality of optical output devices, comprising:

inputting a serial digital bit stream into the first storing means;

while inputting the serial digital bit stream, for each optical output device, measuring low and high optical output power levels with an optical power meter; and when desired low and high optical output power levels are obtained, storing associated digital bit stream values.

13. The method according to claim 12, wherein the optical output devices each comprise a laser and a laser switch, the method further comprising:

inputting differential input data signals to each respective laser switch to cause the laser optical power to switch between a low level, set by the output of the threshold current adjusting means and a high level, set by an addition of the outputs of the threshold current adjusting means and the modulation current adjusting means.

14. The method according to claim 13, wherein the global temperature coefficient adjusting means varies respective low current out of the respective laser switch with a temperature coefficient which is equal in magnitude to the a temperature coefficient characteristic of the respective laser.

15. The method according to claim 14, wherein the global temperature coefficient adjusting means further varies respective modulation current out of the respective laser switch with a temperature coefficient which is equal in magnitude but opposite in sign to a differential quantum efficiency characteristic of the respective laser.

16. The method according to claim 15, wherein each laser comprises a vertical cavity surface emitting laser.

17. A system comprising:

a parallel optical transmitter having a plurality of optical output devices;

first means for individually adjusting a threshold current of each of the plurality of optical output devices without use of a closed loop feedback;

second means for individually adjusting a modulation current of each of the plurality of optical output devices without use of a closed loop feedback; and third means for globally compensating for current variations due to a global ta ere coefficient of the plurality of optical output devices, by adjusting the threshold current and the modulation current; and, fourth mans for receiving and storing control signals to be transferred to the first means and the second means, to thereby set the threshold current and the modulation current at desired levels.

18. The system according to claim 17, further comprising a parallel optical receiver.

19. The system according to claim 18, wherein the parallel optical receiver and the parallel optical transmitter are packaged together as a parallel optical transceiver.

20. The system according to claim 19, wherein there are a plurality of parallel optical transceivers, pairs of which are coupled together by a respective parallel optical bus.

21. The system according to claim 20, wherein the parallel optical bus comprises a parallel optical fiber, and the plurality of optical output devices comprise vertical cavity surface emitting lasers.

22. A system comprising:

a parallel optical transmitter having a plurality of optical output devices;

first means for individually adjusting a threshold current of each of the plurality of optical output devices;

second means for individually adjusting a modulation current of each of the plurality of optical output devices;

third means for compensating for current variations due to a global temperature coefficient of the plurality of optical output devices, by adjusting the threshold current and the modulation current; and fourth means for receiving and storing control signals to be transferred to the first means and the second means, to thereby set the threshold current and the modulation current at desired levels, wherein the fourth means is further for receiving and storing control signals to be transferred to the third means, to thereby set the third means to compensate for current variations due to a global temperature coefficient of the plurality of optical output devices.

* * * * *

UNITED STATES PATENT AND TRADEMARK OFFICE
CERTIFICATE OF CORRECTION

PATENT NO.   : 6,624,917 B1
DATED        : September 23, 2003
INVENTOR(S)  : Matthew James Paschal et al.

It is certified that error appears in the above-identified patent and that said Letters Patent is hereby corrected as shown below:

Column 8,
Line 15, "control" should be -- controlling --,
Line 17, "output comprising:" should be -- output devices comprising: --,
Line 29, "me=and" should be -- means and --, Column 10,
Line 43, "ta ere" should be -- temperature --,
Line 46, "mans" should be -- means --.

Signed and Sealed this

Fourth Day of November, 2003

JAMES E. ROGAN
*Director of the United States Patent and Trademark Office*